Patented Oct. 23, 1934

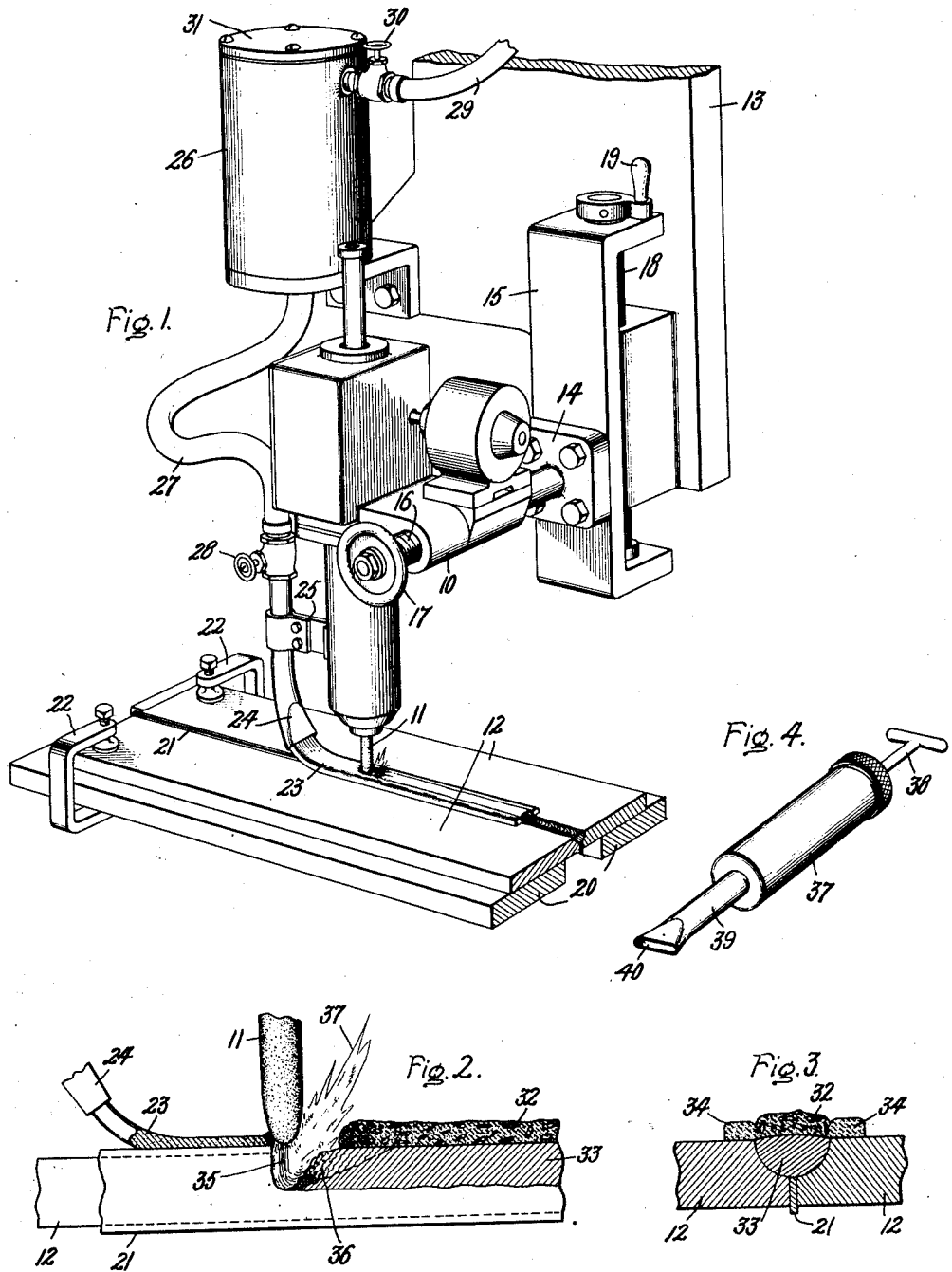

1,978,316

UNITED STATES PATENT OFFICE 1,978,316

ARC WELDING

Virdis Miller, Schenectady, N. Y., assignor to General Electric Company, a corporation of New York Application September 1, 1932, Serial No. 631,351

4 Claims. (Cl. 219—10)

My invention relates to arc welding.

It is an object of my invention to provide an improved method of welding by means of which the action of the arc is restricted both laterally and in the direction of welding, and in which the weld metal is covered during welding with a molten slag which is permitted to solidify on the weld.

Further objects of my invention will become apparent from a consideration of the following description taken in connection with the accompanying drawing, Fig. 1 of which illustrates apparatus for automatically performing my improved method of welding, Figs. 2 and 3 of which illustrate the application of the welding flux and the action of the welding arc upon the flux and the work when welding in accordance with my invention, and Fig. 4 of which illustrates a hand-tool which may be employed for applying flux material to the work to prepare it for welding in accordance with my invention.

The apparatus illustrated in Fig. 1 for automatically performing a welding operation in accordance with my invention forms the subject matter of my divisional application, Serial No. 679,335, filed July 7, 1933, for Arc welding. It comprises a welding head 10 by means of which a welding arc is automatically maintained between an electrode 11 and the work parts 12. This welding head is supported on a member 13 through brackets 14 and 15 by means of which its position relative to the work may be adjusted. The welding head may be adjusted in a horizontal direction along the arm of bracket 14 by means of an adjusting screw 16 provided with a hand-wheel 17, and may be adjusted vertically by movement of bracket 15 whose position relative to member 13 is determined by an adjusting screw 18 provided with a handle 19. The welding head and the work are traversed relatively to one another by relatively moving supports 13 and 20. The work parts 12 as well as a filler strip 21, which may be employed for supplying additional weld metal, are held in adjusted relation relatively to one another on support 20 by clamps 22.

Prior to the welding operation the machine applies a layer 23 of flux material to the work through a nozzle 24 the discharge opening of which is located in front of the welding electrode. In the arrangement illustrated this nozzle is supported by a bracket 25 attached to the welding head 10. Means are provided for controlling the amount of fluxing material applied to the work. In the illustrated arrangement the amount of flux material supplied from a reservoir 26 through a pipe 27 to nozzle 24 may be controlled by adjusting a valve 28 and/or by controlling the amount of air pressure applied to the reservoir through a pipe 29 by an adjustment of valve 30. As illustrated in the drawing, the reservoir 26 comprises a closed cylinder having a head 31 which may be removed for supplying fluxing material thereto.

Referring to Figs. 2 and 3 the layer of fluxing material 23 applied to the work is of sufficient width and thickness to surround the arcing terminal of the electrode. Generally, a layer one-eighth of an inch thick and at least a half inch wider than the diameter of the electrode will prove to be satisfactory. The welding operation is performed by traversing the arcing terminal of the electrode through the central portion of this flux coating which restricts the action of the arc both laterally and in the direction of welding. That part of the flux 32 which is fused by the arc forms a molten slag which is held in place on the weld 33 by the portions 34 thereof which remain unfused and act as a retaining wall for it. The arc 35 is restricted in area by the presence of the flux on the work and its force and heat are directed downwardly to cut away the metal from the plates, force it backward and mix it with the molten metal in the pool 36 thus causing the entire pool to have nearly the same temperature. This temperature is not very much above the melting point of the metal and, consequently, the metal does not boil and form upon cooling a large crystalline grain structure. The arc has a long flame 37 which is forced to play along the surface of the pool and cause it to remain liquid long enough to allow gases and impurities in the molten metal to rise to the surface and escape. This flame also has an annealing action upon the weld which is not present in methods of welding heretofore employed. During welding the surface of the pool is covered by a layer of molten flux. The welding operation is similar to that which occurs in an arc furnace where the arcing tip of the electrode is buried in a fluxing material which floats on top of the charge.

Various fluxing materials may be used in accordance with my invention. I prefer to use a material of substantially the following composition:—

| | Per cent |
|---|---|
| Bentonite clay | 1 |
| Sodium hydroxide | 4 |
| Sodium carbonate | 2 |
| Titanium dioxide | 18 |
| Feldspar | 53 |
| Water | 22 |

The above percentages may be varied considerably without departing from my invention, and I give below the limits of variation permissible in a flux of the above composition:—

| | Per cent |
|---|---|
| Bentonite clay | 0 to 5 |
| Sodium hydroxide | 1 to 10 |
| Sodium carbonate | 1 to 5 |
| Titanium dioxide | 10 to 40 |
| Feldspar | 25 to 74 |
| Water | 12 to 40 |

The base of this flux is feldspar which in the presence of titanium dioxide becomes viscous causing the flux to remain where it collects over the molten metal. In the presence of titanium dioxide, it has no tendency to run down under the arc and stop the welding operation. I prefer to use a potassium feldspar, but other forms of feldspar may be used without departing from my invention. Sodium hydroxide forms with the titanium dioxide in the flux a titanate which has a beneficial fluxing action on the arc. The sodium hydroxide also acts to lower the melting point of the vitreous material in the flux causing it to form over the metal directly behind the arc. Any other alkali hydroxide having a melting point substantially the same as that of sodium hydroxide may be used. For example, potassium hydroxide is a suitable material. The chemical reaction between the titanium dioxide and the alkali hydroxide is rather sluggish but during the reaction enough water is given off to fill the molten slag with steam. This causes it to be very porous and very light, and the presence of the flux on the molten metal does not form depressions in the weld when enough of this material is used to form a satisfactory coating. The sodium carbonate has a fluxing effect on the molten metal. The bentonite clay above referred to is a hydrated aluminum silicate which forms a viscous solution or suspension with water. It has a colloidal property and is sometimes referred to as colloidal clay. This material holds the water in the flux long enough to prevent its being melted until the arc is quite near to it. This makes the flux melt at the proper time and prevents the arc from shifting out of the pool. By reason of its presence the flux is used at the proper time and the resultant weld metal is cleaned more effectively. There are several forms of bentonite, but I prefer to use a material sold by the American Colloid Company of Chicago, Ill., under the trade name "Volclay". This material has the following average analysis:—

| | |
|---|---|
| SiO | 61.78 |
| $Fe_2O_3$ | 3.10 |
| FeO | .28 |
| MnO | .08 |
| $Al_2O_3$ | 21.56 |
| CaO | .68 |
| MgO | 2.62 |
| $K_2O$ | .31 |
| $Na_2O$ | 2.22 |
| $SO_3$ | Trace |
| Moisture at 110° C | 2.98 |
| Ignition loss | 4.73 |
| Specific gravity | 2.7 |
| Fusion point | 2462–2552° C. |

It absorbs 4 to 5 times its weight of water and swells 12 or 15 times its dry bulk. When saturated it forms a gelatinous mass. In 30 parts of water 85 per cent remains in permanent suspension. The welding flux above described forms the subject matter of my divisional application, Serial No. 679,336, filed July 7, 1933, for Arc welding flux.

As has been noted above various kinds of fluxing materials may be employed when welding in accordance with my invention. I have used a flux consisting of one part "Sil-O-Cel" brick dust; one half part wood pulp, and two parts ferro-manganese low in carbon. These materials in powdered form are mixed into a paste with liquid sodium silicate. I have also used a flux of the following composition. Equal parts of feldspar, talc, titanium dioxide and powdered cornstalks mixed into a paste with three times the total weight of the mixture of liquid sodium silicate. The materials employed are preferably in finely divided form in order to produce a pasty material of uniform texture.

Welding in accordance with my invention may be performed manually. The paste may be applied to the work with a trowel or similar instrument, although I prefer to use a tool such as illustrated in Fig. 4 by means of which paste enclosed within a cylinder 37 is forced, by a plunger connected to a handle 38, through a nozzle 39 having an opening 40 through which the paste is discharged as a narrow ribbon of the desired thickness.

As has been pointed out above the paste should be at least an eighth of an inch in thickness and of sufficient width to leave on each side of the weld a retaining wall of unfused flux at least one-eighth of an inch in width. When welding half inch steel plates I prefer to employ an electrode of about ⅜ of an inch in diameter, a welding current of 650 to 700 amperes and an arcing voltage of from 28 to 32 volts. The penetration of the arc is in a large measure controlled by the rapidity with which the weld is made. On half inch plates I prefer to form the weld at about 10 inches per minute which will give a penetration of about ¼ of an inch.

When using my preferred flux the weld is fine grained, non-porous, ductile and of great strength. When using boiler plate (A. S. M. E. specifications) having a tensile strength of 59,000 pounds per square inch, the average tensile strength of the weld metal is from 60,000 to 67,000 pounds per square inch. Sixty-one per cent elongation without checking or cracking was obtained when subjecting the weld to a bending test. Using a 1/16 inch steel ball and a 100 kilogram load, a Rockwell hardness test gave average readings of 68 for the parent metal, 71 for the zone between the weld and the parent metal, and 74 for the metal of the weld.

Although not limited thereto my invention is particularly adapted for welding with non-consuming electrodes, such as carbon or graphite electrodes. Other forms of non-consuming electrodes may be used, however, such as internally cooled metallic electrodes or electrodes formed of refractory materials such as tungsten, molybdenum or the like.

The thickness of the fluxing material applied to the work may be much greater than the one-eighth inch above specified and will vary with the size and type of electrode employed. In fact, one of the characteristic features of my invention is that the fluxing material is applied to the work as a comparatively thick coating. This coating should be heat resisting and non-conducting in character, in order to have a confining action on the arc. Welds produced in accordance with my invention have a surface width of about 75 per cent the width of welds made by other methods in which the action of the arc is not confined. Alloying materials may be used in the fluxing material without departing from my invention, but I prefer to apply the alloying material to the weld in the form of a filler strip since when supplied in the fluxing material it collects on the tip of the electrode attacking it and causing the action of the welding arc to become erratic thus producing poor welds.

It is preferable to employ current densities such as those above referred to by way of example, although my method of welding is in no way dependent upon the use of such current densities. It is also desirable not to attempt to secure too great a penetration when welding in accordance with my invention for the arc will strike over to the sides of the crater formed in the work parts and produce poor welds.

What I claim as new and desire to secure by Letters Patent of the United States, is:

1. The method of arc welding which includes the steps of applying to the seam and to the surface of the work on each side of the seam a layer of paste containing fusible flux material, and traversing the arcing terminal of a non-consuming electrode through the central portion of said paste layer leaving the edge portions thereof unfused.

2. The method of arc welding which includes the steps of applying to the seam and to the surface of the work on each side of the seam a layer of heat resisting, non-conducting, fusible flux material and welding through the central portion of said layer leaving the edge portions thereof unfused and forming walls which restrict the action of the arc and maintain in position on the weld the flux rendered molten during said welding position.

3. The method of arc welding which includes the steps of applying to the seam and to the surface of the work on each side of the seam a layer of heat resisting material containing cellulose and welding through the central portion of said layer leaving the edge portions thereof unfused and forming walls which restrict the action of the arc and maintain in position on the weld the flux rendered molten during said welding operation.

4. The method of arc welding which includes the steps of covering the work to be welded with a layer of fusible flux material at least one-eighth of an inch in thickness and of sufficient width to leave on each side of the weld after the welding operation has been performed a wall of unfused flux and performing the welding operation by traversing through the central portion of said layer the arcing terminal of a welding electrode having a diameter at least one-half of an inch less than the width of said layer of flux material.

VIRDIS MILLER.